United States Patent [19]
Chen

[11] Patent Number: 5,577,868
[45] Date of Patent: Nov. 26, 1996

[54] DEPTH STOP FOR A DRILL PRESS

[76] Inventor: Ruey Z. Chen, No. 261, Jen Hwa Rd., Tali City, Taichung, Taiwan

[21] Appl. No.: 496,410

[22] Filed: Jun. 29, 1995

[51] Int. Cl.$^6$ ..................................................... B23B 49/00
[52] U.S. Cl. ........................................ 408/14; 408/241 S
[58] Field of Search .......................... 408/14, 110, 111, 408/112, 136, 234, 241 S

[56] References Cited

U.S. PATENT DOCUMENTS

| | | | |
|---|---|---|---|
| 2,574,653 | 11/1951 | Miller | 408/241 S |
| 2,664,768 | 1/1954 | Clyne | 408/241 S |
| 2,736,227 | 2/1956 | Stroble | 408/241 S |
| 2,909,082 | 10/1958 | Booth | 408/14 |
| 4,445,811 | 5/1984 | Sanders | 408/241 S |
| 4,693,656 | 9/1987 | Guthrie | 408/241 S |
| 4,710,075 | 12/1987 | Davison | 408/241 S |
| 4,770,573 | 9/1988 | Monobe | 408/241 S |
| 5,127,775 | 7/1992 | Broadbent et al. | 408/241 S |

*Primary Examiner*—Daniel W. Howell
*Attorney, Agent, or Firm*—Morton J. Rosenberg; David I. Klein

[57] ABSTRACT

A depth stop for a drill press includes a block having a passage defined centrally therein and a cut-away laterally defined therein which communicates with the passage, an oblong element received in the block from the cut-away and a resilient element disposed between the oblong element and the block, the oblong element having an oblong hole defined therein and having a threaded portion defined in an inner periphery of the oblong hole for engagement with a threaded rod which extends through the block and the oblong element, the block is freely moved along the threaded rod by pushing the oblong element to bias the resilient element to disengage the threaded portion from the threaded rod.

4 Claims, 5 Drawing Sheets

DEPTH STOP FOR A DRILL PRESS

BACKGROUND OF THE INVENTION

1. Field of the Invention

The present invention relates to a depth stop and more particularly, to a depth stop for a drill press, the depth stop is adjustably disengaged from a threaded rod of the drill press so as to adjust the drilling depth quickly.

2. Related Prior Art

A conventional drill press is shown in FIG. 1, which includes a base 70, a column 71 disposed vertically to the base 70, a table 72 movably mounted to the column 71, a drill mechanism 73 disposed to the column 71 and which is driven by a motor 74 disposed to the column 71, the drill mechanism 73 having a chuck 76 movably disposed to a shaft (not shown) received in the mechanism 73 and a drill 78 securely disposed to an under side of the chuck 76. A threaded rod 75 having one end thereof to be connected to a connecting element 751 which extends from the drill press, the other end of the threaded rod 75 is a distal end and the depth stop includes two nuts 77 engaged to the threaded rod 75 together such that when the drill 78 is lowered by rotating a feed lever 79 rotatably disposed to the drill mechanism 73, the threaded rod 75 is lowered together with the drill 78 and is stopped when the nuts 77 contact the connecting element 751 such that the drill depth can be set by adjusting the nuts 77 on the threaded rod 75. However, the nuts 77 is adjusted on the threaded rod 75 can only by threadedly rotating them along the threaded rod 75 and this takes time which is deemed to be unefficient.

The present invention intends to provide an improved depth stop which includes a block, an oblong element and a resilient element, the oblong element is laterally and movably received in the block by a resilient element disposed therebetween, the threaded rod extending between a passage of the block and an oblong hole of the oblong element and the oblong element has a threaded portion defined in an inner periphery of said oblong hole for engagement with the threaded rod such that the threaded portion of the oblong element can be disengaged from the threaded rod by pushing the oblong element toward the spring and the depth stop is freely moved along the threaded rod and therefore a new drilling depth is easily to be set so as to mitigate and/or obviate the above-mentioned problems.

SUMMARY OF THE INVENTION

The present invention provides a depth stop for a drill press, which includes a block having a passage defined centrally therein and a cut-away laterally defined therein which communicates with the passage, an oblong element received in the block from the cut-away and a resilient element disposed between the oblong element and the block, the oblong element having an oblong hole defined therein and having a threaded portion defined in an inner periphery thereof for engagement with a threaded rod which extends through the block and the oblong element, the block is freely moved by pushing the oblong element to bias the resilient element to disengage the threaded portion from the threaded rod thus the block can be moved to a new position along the threaded rod.

It is a main object of the present invention to provide a depth stop which can be moved along the threaded rod of the drill press quickly.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
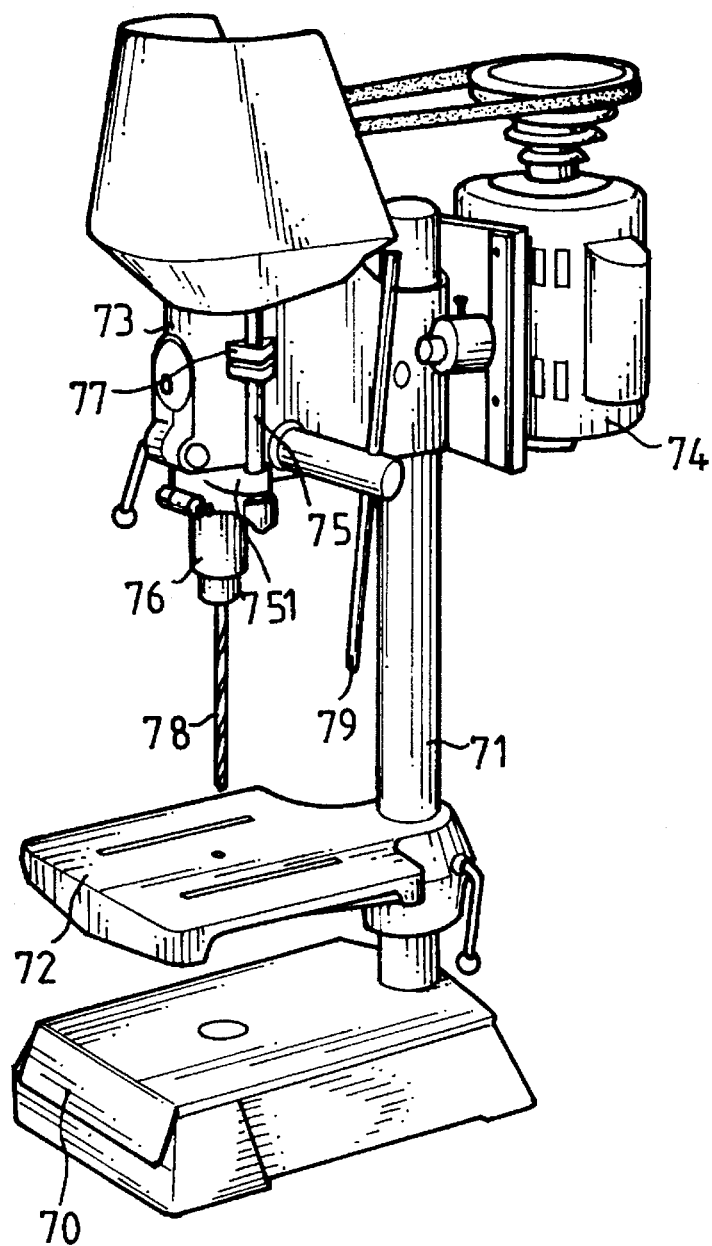
FIG. 1 is a perspective view of a drill press with a conventional depth stop disposed thereto.
Figure 2:
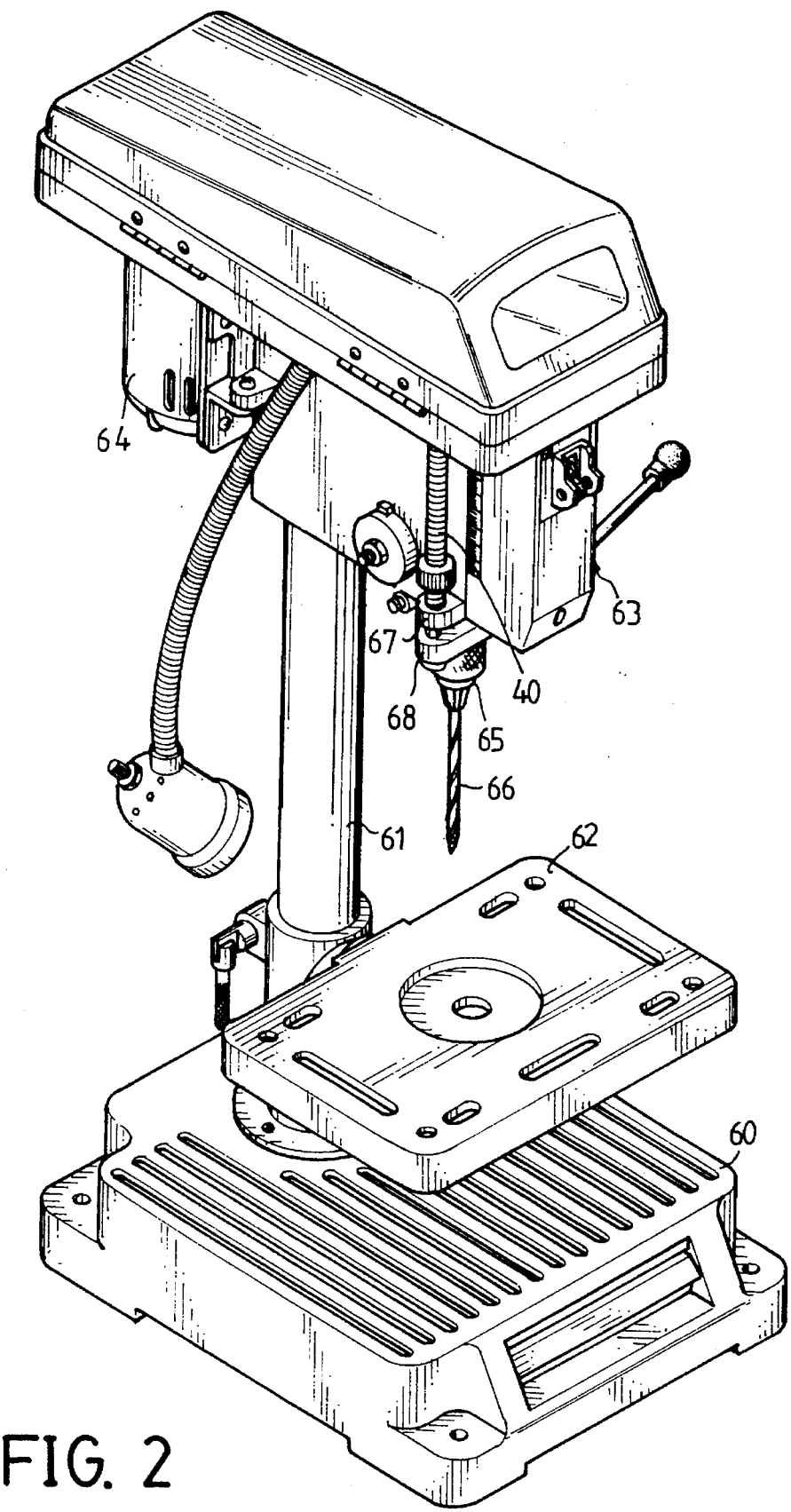
FIG. 2 is a perspective view of a drill press with a depth stop in accordance with the present invention disposed thereto.
Figure 3:
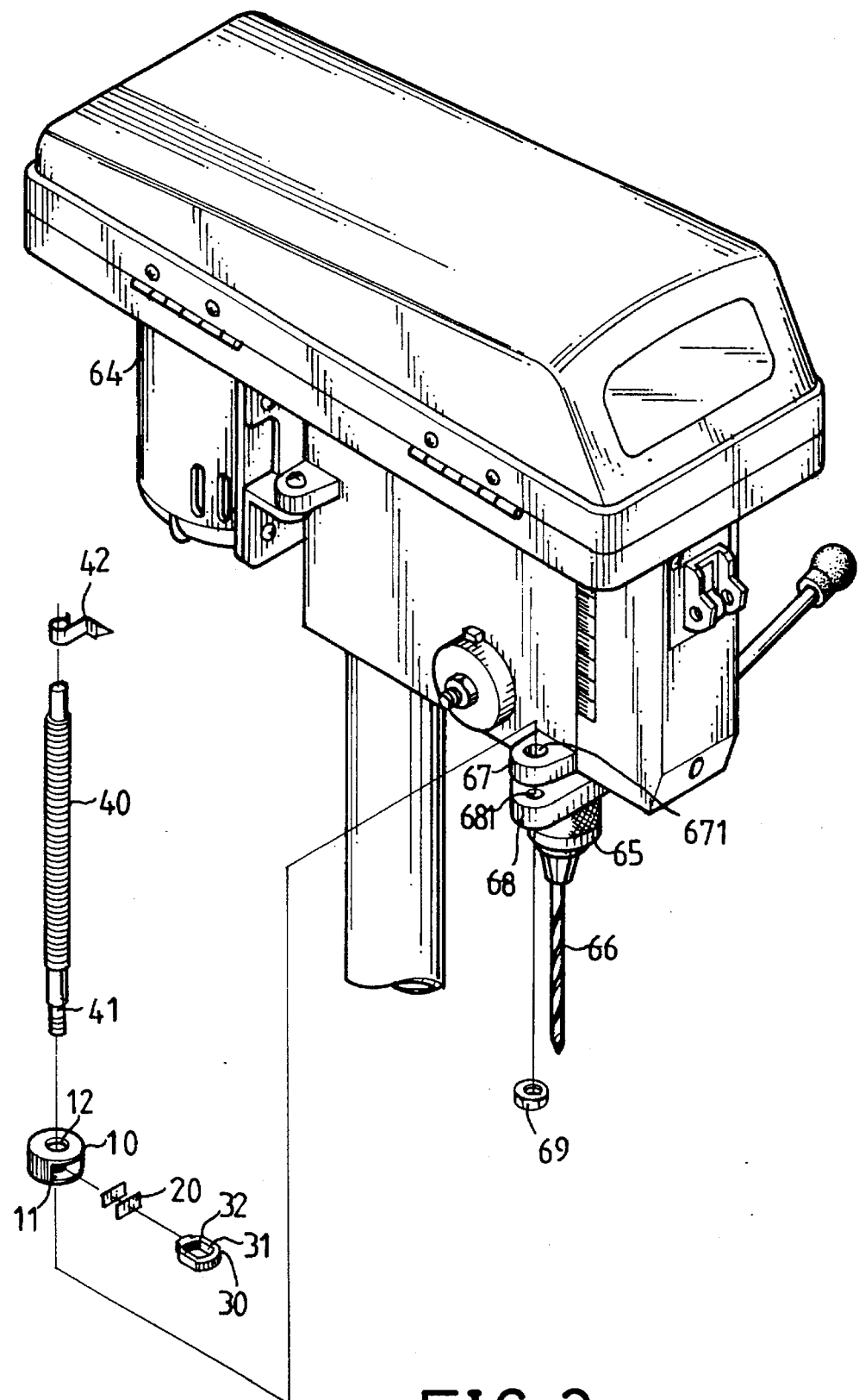
FIG. 3 is an exploded view of a threaded rod and the depth stop in accordance with the present invention.
Figure 4:
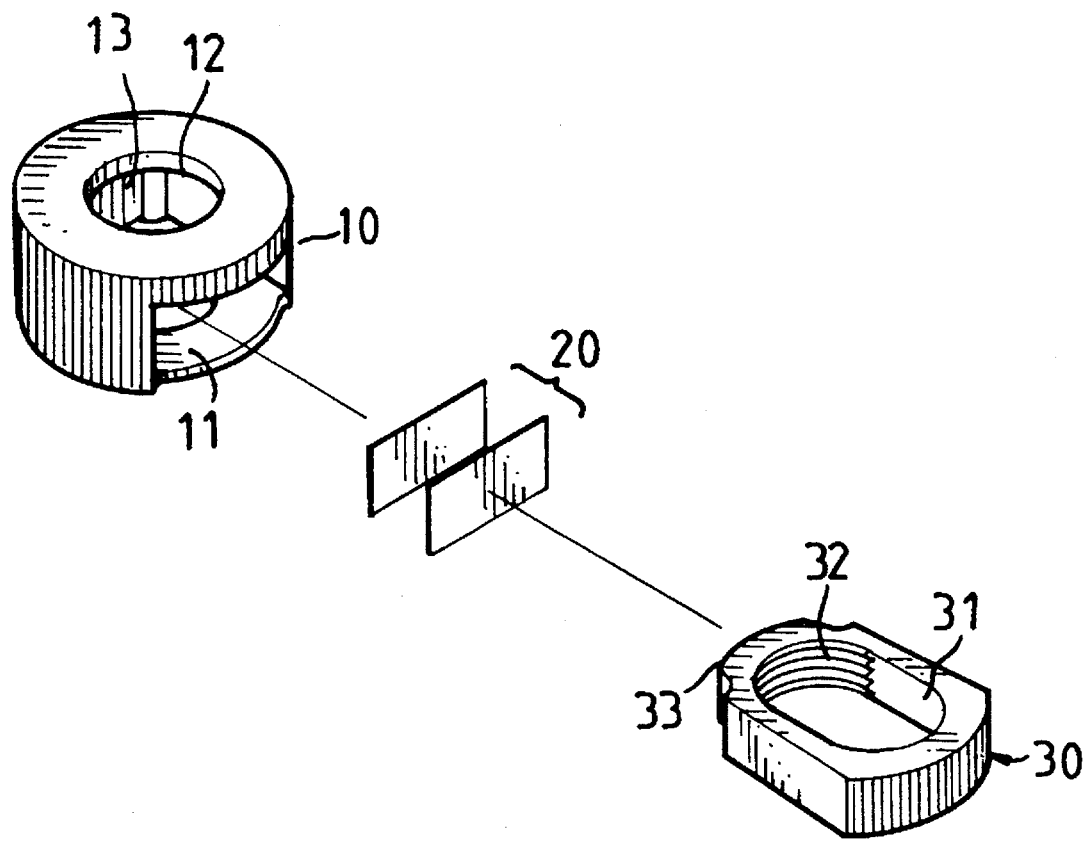
FIG. 4 is an exploded view of the depth stop in accordance with the present invention.

Referring to the drawings and initially to FIGS. 2 through 4, a depth stop for a drill press in accordance with the present invention generally includes a block 10, an oblong element 30 and a resilient element 20 which are two thin plates in this preferred embodiment. The drill press comprises a base 60, a column 61 disposed vertically to the base 60, a table 62 movably mounted to the column 61, a drill mechanism 63 with a motor 64 disposed thereto to be disposed to the column 61, the drill mechanism 63 having a chuck 65 movably disposed thereto and a drill 66 securely disposed to an under side of the chuck 65. The drill mechanism 63 has a first connecting element 67 and a second connecting element 68 both extending laterally therefrom, each of the first connecting element 67 and the second connecting element 68 has a hole 671, 672 defined therein and the two holes 671, 672 are in alignment with each other. A threaded rod 40 has a first end and a second end, the first end thereof having a threaded periphery 41 defined therein and which extends through the two holes 671, 681 of the first and the second connecting elements 67, 68 and engaged to a nut 69, and the second end of the threaded rod 40 being a distal end and having an indicator 42 disposed thereto.

The depth stop includes a block 10, an oblong element 30 and a resilient element 20, the block 10 having a passage 12 defined centrally therein and a cut-away 11 defined laterally therein which communicates with the passage 12, the passage 12 having a diameter larger than that of the threaded rod 40, a recess 13 defined in an inner periphery of the block 10 and diametrically corresponding to the cut-away 11. The block 10 has a rough surface defined in an outer surface thereof.

The oblong element 30 has a first end and a second end, the first end thereof having a protrusion 33 extending outwardly therefrom and the second end thereof having a rough surface defined therein, an oblong hole 31 defined in the oblong element 30 and a threaded portion 32 defined in an inner periphery of the oblong hole 31 and near the protrusion 33, the oblong element 30 is received in the block 10 from the cut-away 11 by inserting the first end of the oblong element 30 therein. The threaded rod 40 is inserted through the passage 12 of the block 10 and the oblong hole 31 of the oblong element 30 and a diameter of the oblong hole 31 is larger than that of the threaded rod 40. The resilient element 20 including two plates is disposed between the protrusion 33 and the inner periphery of the block 10 and is received in the recess 13 such that the oblong element 30 is biased by the resilient element 20 to firmly engage the threaded portion 32 with the threaded rod 40 such that a distance between the depth stop in accordance with the present invention and the first connecting element 67 can be set and, the second end of the oblong element 30 extends out of the block 10.

Figure 6:
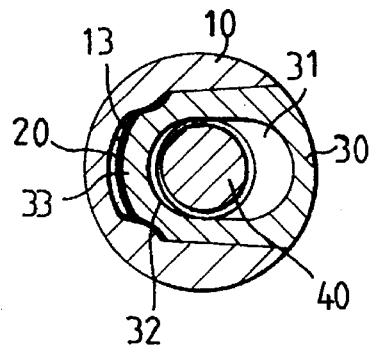
FIG. 6 is a top plane view in section of the depth stop wherein the oblong element is pushed into the block.
Figure 5:
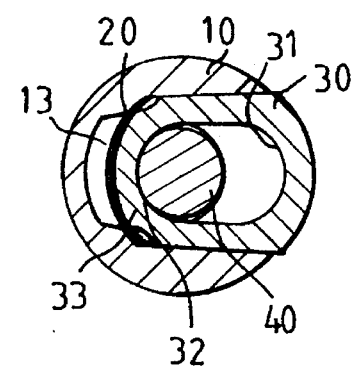
FIG. 5 is a top plane view in section of the depth stop wherein the oblong element is not yet pushed.
Figure 7:
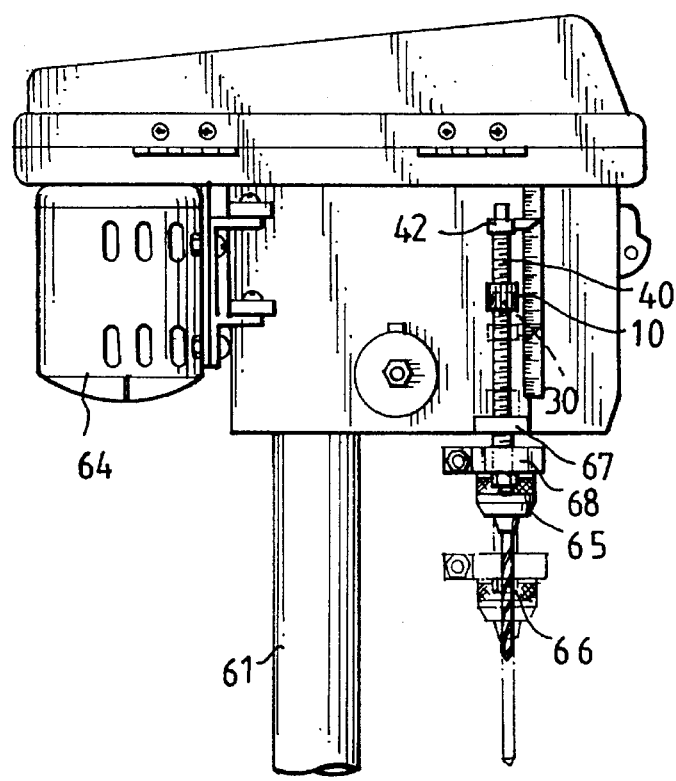
FIG. 7 is a side elevational view of part of the drill press wherein the threaded rod and the depth stop are lowered shown by phantom lines.

Further referring to FIGS. 5, 6 and 7, the threaded portion 32 of the oblong element 30 is biased to engaged with the threaded rod 40 by the resilient element 20, such that when the threaded rod 40 is lowered with the drill 66, the drilling depth is determined by a contact between the block 10 and the first connecting element 67. When a new drilling depth is going to be set, an operator may push the second end of the oblong element 30 toward the resilient element 20 to move the threaded portion 32 away from the threaded rod 40 such that the block 10 and the oblong element 30 can be freely moved along the threaded rod 40 to a pre-determined position. When releasing the oblong element 30, the threaded portion 32 of the oblong element 30 is again to b biased to engage with the threaded rod 40.

Therefore, when adjusting the depth stop, the operator needs only to push the second end of the oblong element 30 toward the resilient element 20 then the block 10 and the oblong element 30 are freely to be moved along the threaded rod 40 to a desired position and the oblong element 30 is then released, the oblong element 30 is then biased to engage the threaded portion 32 with the threaded rod 40 to set a new drilling depth.

Although the invention has been explained in relation to its preferred embodiment, it is to be understood that many other possible modifications and variations can be made without departing from the spirit and scope of the invention as hereinafter claimed.

I claim:

1. A depth stop for a drill press, said drill press comprising a base, a column disposed vertically to said base, a table movably mounted to said column, a drill mechanism including a motor disposed thereto, said drill mechanism having a chuck movably disposed thereto and a drill securely disposed to an under side of said chuck, said drill mechanism having a connecting element extending laterally therefrom, a threaded rod having a first end and a second end, said first end of said threaded rod securely connected to said connecting element and said second end of said threaded rod being a distal end;

said depth stop including a block, an oblong element and a resilient element, said block having a passage defined centrally therein and a cut-away defined laterally therein which communicates with said passage, said passage having a diameter larger than that of said threaded rod, a recess defined in an inner periphery of said passage of said block and diametrically corresponding to said cut-away;

said oblong element having a first end and a second end, said first end thereof having a protrusion extending outwardly therefrom, an oblong hole defined in said oblong element and a threaded portion defined in an inner periphery of said oblong hole and near said protrusion, said oblong element received in said block from said cut-away by inserting said first end of said oblong element therein;

said threaded rod inserted through said passage of said block and said oblong hole which has a diameter larger than that of said threaded rod, said resilient element disposed between said protrusion and said recess of said block, said oblong element being biased by said resilient element to engage said threaded portion with said threaded rod and said threaded portion disengaged from said threaded rod by pushing said oblong element toward said resilient element.

2. The depth stop as claimed in claim 1 wherein said block has a rough surface defined in an outer surface thereof.

3. The depth stop as claimed in claim 1 wherein said second end of said oblong element extends out from said cut-away of said block when not pushed.

4. The depth stop as claimed in claim 1 wherein said first end of said threaded rod has an indicator disposed thereto.

\* \* \* \* \*